United States Patent
Chen et al.

[19]

[11] Patent Number: 5,986,646

[45] Date of Patent: *Nov. 16, 1999

[54] METHOD AND APPARATUS FOR FINDING THE LOCATION OF A POINTING INSTRUMENT ON A TABLET

[75] Inventors: Chien-Hung Chen; Jung-Chih Hsu; Che-Wei Hsu, all of Taipei Hsien, Taiwan

[73] Assignee: Ace Cad Enterprise Co., Ltd., Taipei Hsien, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/898,594

[22] Filed: Jul. 22, 1997

[51] Int. Cl.$^6$ ...................................................... G09G 5/00

[52] U.S. Cl. ........................................... 345/173; 345/179

[58] Field of Search ..................................... 345/173, 174, 345/179; 178/18, 19, 18.01–20.01

[56] References Cited

U.S. PATENT DOCUMENTS

| | | | |
|---|---|---|---|
| 4,210,775 | 7/1980 | Rodgers et al. | 178/19 |
| 4,734,546 | 3/1988 | Landmeier | 178/19 |
| 4,831,216 | 5/1989 | Landmeier | 178/19 |
| 5,134,253 | 7/1992 | Doubrava | 178/19 |
| 5,693,914 | 12/1997 | Ogawa | 345/173 |
| 5,768,616 | 12/1995 | Teterwak | 345/173 |

*Primary Examiner*—Richard A. Hjerpe
*Assistant Examiner*—Ronald Laneau
*Attorney, Agent, or Firm*—Bacon & Thomas

[57] ABSTRACT

The present invention is related to a method and apparatus for locationing a instrument of tablet, wherein a very simple equation is used to locate a instrument, for example, a stylus pen. The stylus pen location on the a sense line grid which formed by a set of spaced conductors is converted to a digitized number and can be reported to the host computer for controlling the screen cursor or making a sketch drawing.

5 Claims, 9 Drawing Sheets

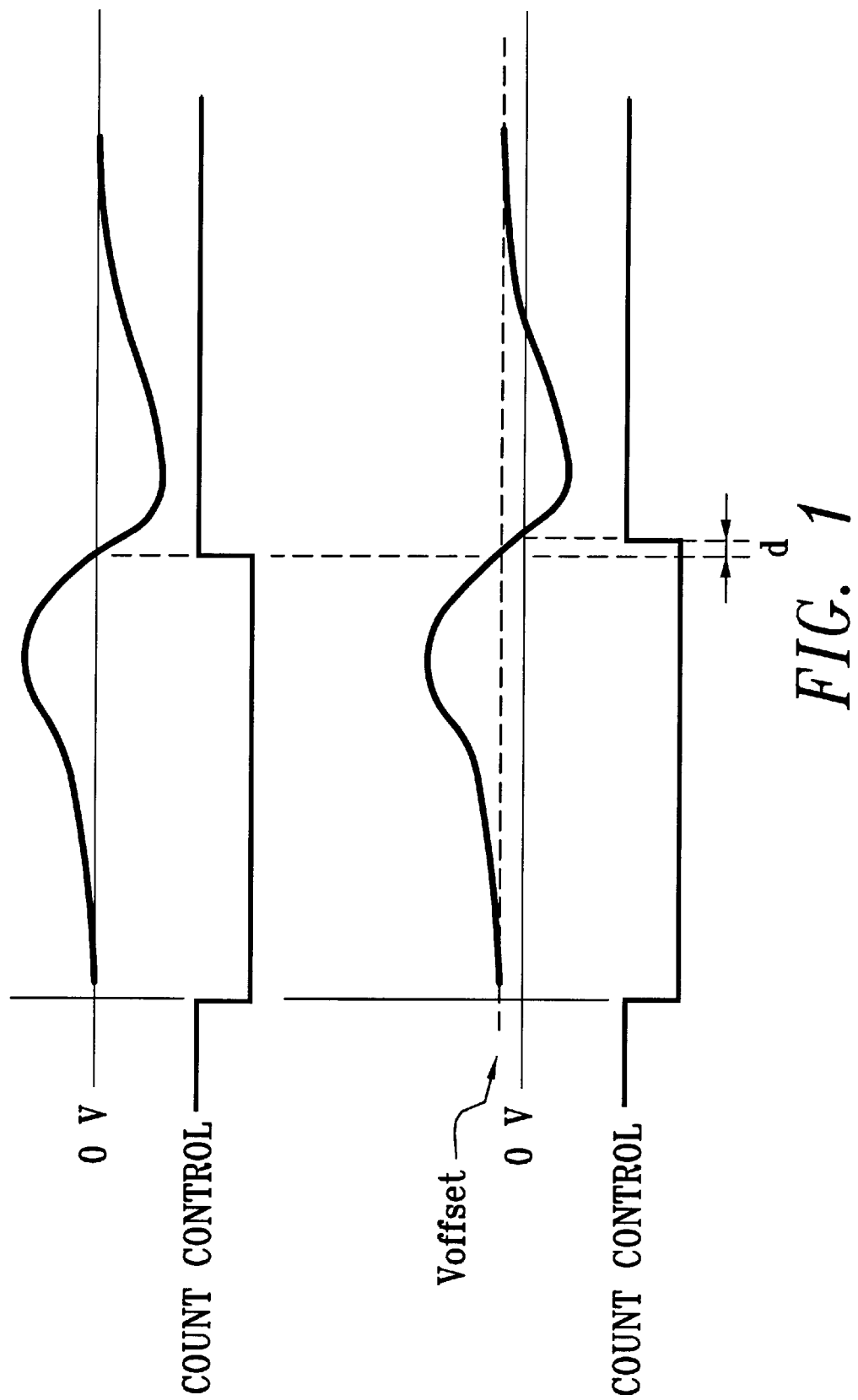

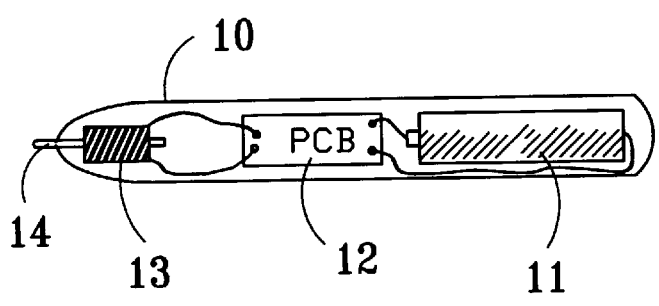
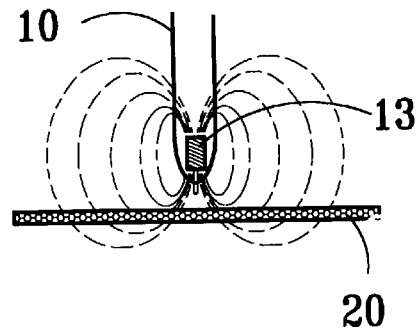
FIG.2(A)  FIG.2(B)
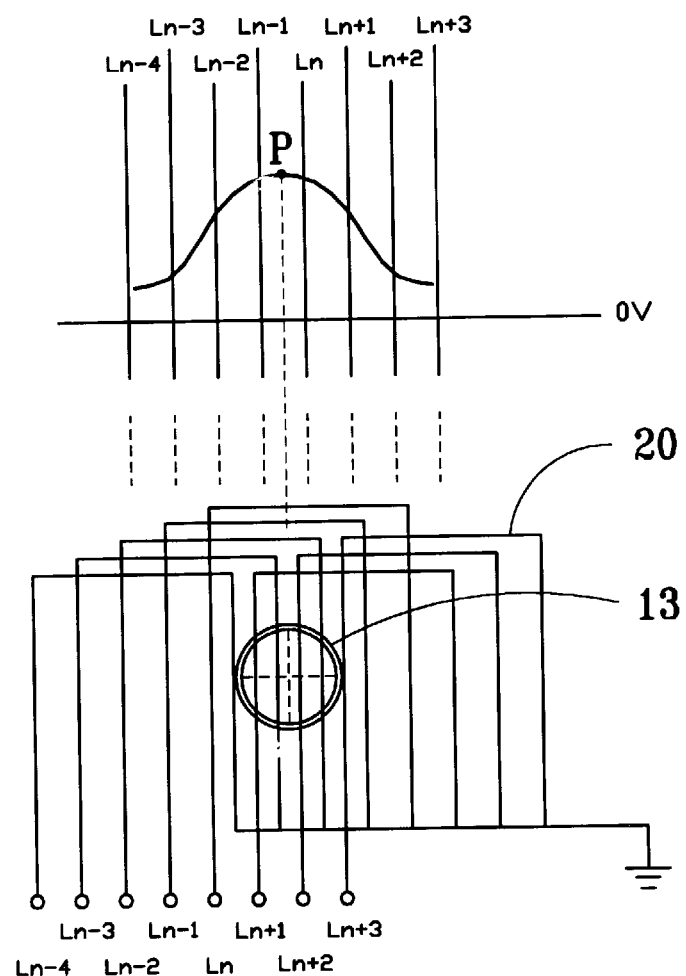
FIG.3

Signal on the
Sensing Grid

Signal 1

Signal 2

Signal A

METHOD AND APPARATUS FOR FINDING THE LOCATION OF A POINTING INSTRUMENT ON A TABLET

BACKGROUND OF THE INVENTION

1. Field of the Invention

The present invention is related to a method and apparatus for locationing a instrument of tablet, especially to a method and apparatus in which a location is searched by a tablet instrument.

2. Description of the Prior Art

In the prior art, such as that discloses in the U.S. Pat. Nos. 4,210,775 and 4,423,286 and the U.S. Pat. No. 4,428,192 which is disclosed by the inventor of the present invention, in general, a coil is arranged in the front end of pen, and meanwhile an alternating current signal with fixed frequency and fixed amplitude is applied to the coil, therefore, a sense line grid which comprises some spaced conductors on the tablet may induce a relative alternating current signal.

For example, in U.S. Pat. No. 4,210,775, a scanning circuit is used to scan said spaced conductors, firstly it scans along X direction and then the Y direction. For each directions, the scanning process begins from the first conductor. The sequentially induced signal is input to a signal amplifier, each time the scanning process begins a counter is reset and start to count. The count operation is continued while the scanning process is going on, and the counter is increased in a fixed frequency higher than the scanning rate.

The output of said amplifying circuit is connected to the input of a synchronous phase detector, when the scanning process is scanning across the pen tip i.e. "from one side of the pen tip to another side thereof", the polarity of the output signal of the synchronous phase detector will be change. Then the signal is passed through a low pass filter to a comparing device. A pulse signal with rising edge is produced at the "Zero-Crossing" point of the filtered signal. The said pulse signal is used to stop the said count operation of the counter. The final value in the counter is then recorded, which represents the location of the pen tip in a sense line grid.

The aforementioned technology has been improved by the inventor of the present invention, and the improved result is disclosed in the U.S. Pat. No. 5,428,192, in which the start point of the count operation is changed. The said zero-crossing point of the filtered signal is used as a trigger to start a count operation, as the scanning is switched to the following next sense line the count operation is stopped. Therefore, the counting period is reduced and the length of the counter is also greatly reduced.

As described in U.S. Pat. No. 4,423,286, during the operation of sequentially scanning the induced signal from each of the spaced conductors is passed through a rectifier, a filter, and a Analog-Digital converter to obtain the amplitude of induced signal thereof, wherein the polarity of the phase angle of each said induced signal is detected by phase detector. When the polarity of the signal is varied during scanning, the amplitude of positive and negative signals may be substituted into a formula for operation, thus the location of the pen tip may be determined.

According to the aforementioned methods, the phase of said induced alternating signal has to be obtained to produce the zero-crossings during the process, as shown in FIG. 1, However, during the process of signal amplifying and filtering, if the process is affected by internal or external noises or by the tolerance of components so that there may be a DC offset voltage Voffset on the filtered signal, then the zero-crossing point will drift, a count error d will be generated.

Furthermore, the phase of the induced alternating current signal is important for determining the location of the pen, then the phase signal from the coil in the pen must be obtained so as to compare with said induced signal to get the phase difference. In the conventional tablet design, the phase signal of the coil is connected to the scanning circuit by a wire. But now in practical usage, a wireless pen is desired for a better feeling when making a sketch or writing a signature. Thus a low cost wireless pen is difficult to implement.

Thus it is apparent that the methods and apparatus for determining the location of the instrument on a tablet still have some defects.

SUMMARY OF THE INVENTION

Therefore, the main objective of the present invention is to provide a method and apparatus for finding the location of a instrument on a tablet, which method and apparatus can ignore the phase signal of the coil in the instrument.

Another objective of the present invention is to provide a method and apparatus for finding the location of a instrument on a tablet, which method and apparatus can employ a wireless instrument with a most cost effective way.

Another objective of the present invention is to provide a method and apparatus for finding the location of a instrument on a tablet, which method and apparatus can ignore the DC offset voltage generated while amplifying the induced signal.

Another objective of the present invention is to provide a method and apparatus for finding the location of a instrument on a tablet, which method and apparatus can determine the location of a instrument with only three induced signal and the calculation is very simple.

According to the method and apparatus of the present invention, a coil is supported over a grid of spaced conductors that is embedded in a tablet. The coil unit can produce an AC signal, and the spaced conductors on the surface of the tablet can induce said AC signal. The induced signal then can be input to a signal processing circuit to obtain the amplitude of said induced signal. An Analog-Digital converter will convert said amplitude to a digital number. A microcontroller which employs a scanning process can scan through the spaced conductors and get the converted said digital number to find the sense line which has the largest amplitude. And then find another two sense lines with the second amplitude and third amplitude.

With these three values, we can determine the location of the instrument on a tablet by a very simple calculation. With the above mentioned method and apparatus, we can implement a tablet design with low hardware cost. And, the frequency and the phase of the AC signal that emitted by said coil can be ignored. Furthermore, the determined location of the instrument will not be affected by the DC offset voltage from the noise.

BRIEF DESCRIPTION OF THE DRAWINGS

FIG. 1 shows a count error due to the DC offset voltage in the conventional tablet.

FIG. 2(A) shows an embodiment of a wireless pointing pen.

FIG. 2(B) shows how the sense line grid induce the signal from a pen.

FIG. 3 shows a coil in the pen of FIG. 2 is located on a sense line grid and the relation between the induced signal and the distance from conductors to the coil.

DETAILED DESCRIPTION OF THE PREFERRED EMBODIMENT

Figure 4A:
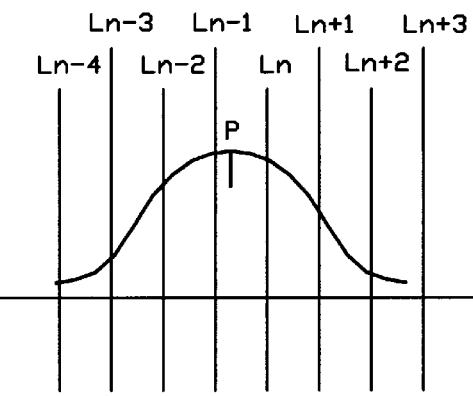
FIG. 4(A) shows the relation between "the distance from the coil to the sense line" and "the strength of the induced signal"

FIG. 2(A) shows an embodiment of a wireless pointing pen 10. FIG. 2(B) shows how the pointing pen 10 works on the sense line grid 20. Wherein, a battery unit 11 is connected to a PCB (printed circuit board) 12. An AC signal is generated by a circuit on the PCB 12. The said AC signal will be emitted through a coil 13 which is placed near the pen tip 14. Therefore, when the pen tip 14 is put on the sense line grid 20, an induced AC signal can be obtained from said sense line grid 20.

FIG. 3 shows the arrangement of the coil on the sense line grid, each of the sense line is formed by the at least one forward conductors and at least one backward conductors. With a scanning process unit, we can sequentially select each conductor to get the induced signal on it, and the amplitude of the signal is larger as the center of sense line is near the center of the coil. For example, the induced signal on sense lines Ln−1 and Ln will be larger than the other sense lines.

Figure 4B:
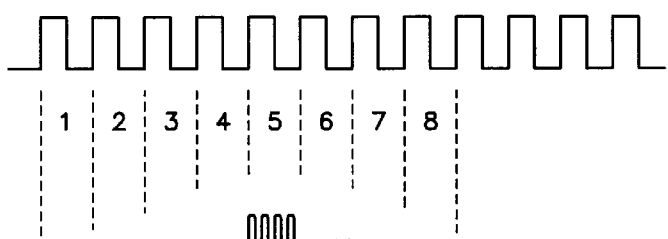
FIG. 4(B) is the sequential selecting signal for a scanning process.
Figure 4C:
FIG. 4(C) shows the induced AC signal which has been amplified by a signal amplifier.
Figure 4D:
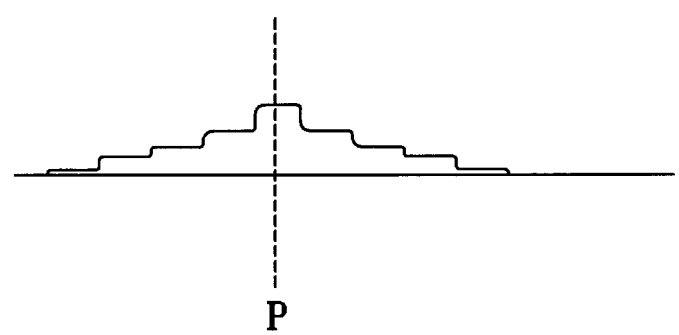
FIG. 4(D) shows the process that the scanning line signal of FIG. 4(C) is converted to an amplitude signal through an amplitude detector and a filter.

Now referring to FIG. 4(A) which shows the relation between "the distance from the coil to the sense line" and "the amplitude of the induced signal", wherein the point P has peak value. In FIG. 4(B), Signal 1 is a sequentially selecting signal for the scanning process. When the induced signals are derived from the sense lines sequentially, Signal 2 in FIG. 4(C) may be fed into a signal amplifier. The induced signal of each sense line may be converted into an amplitude signal Signal A through an amplitude detector, as shown in FIG. 4(D), then the Signal A is further input into a Analog-Digital converter, then the digitized value for signal of each scanning line can be obtained by a microcontroller, the pen tip location will be near the sense line with the maximum induced signal. Thus the location of that sense line with maximum signal is the peak value point.

In the FIG. 4(A), the relation of the "distance from the sense line to the center of coil" and "the amplitude of the induced signal" is similar to a parabola, and the space between sense lines are equal. Thus, with said peak value point we only know the pen tip is near that sense line, while the accurate location of the pen tip must be obtained by a complicated calculation. At first, a mathematical equation which can produce the curve shown in FIG. 4(A) may be obtained from experiment and calculation. Then, every time when the sequentially scanning is over, the peak value point and the other points located nearby the said peak value point may be substituted into said mathematical equation, thus the exact peak value of the curve may be obtained, the accurate location of said pen tip is determined.

However, said mathematical equation is a high order polynomial equation, thus the calculation is complicated. While in a practical design, we have to consider the cost, the high speed and high performance microprocessor may not be used. Therefore, in the present invention a new technology is disclosed for simplifying said complicated calculation.

Figure 5A:
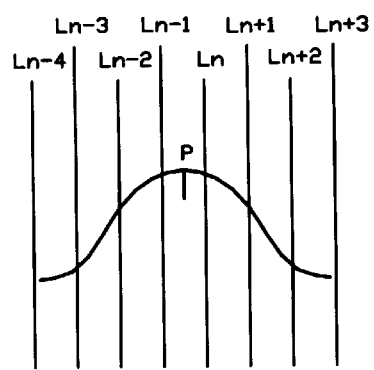
FIG. 5(A) shows an actual induced signal curve of FIG. 4(A) which is similar to a parabola.
Figure 5B:
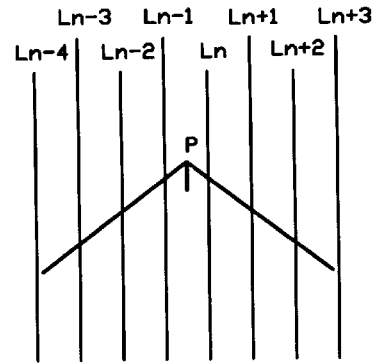
FIG. 5(B) shows that the induced signal curve of FIG. 5(A) is simplified as two straight lines which is similar to a isosceles triangle.
Figure 5C:
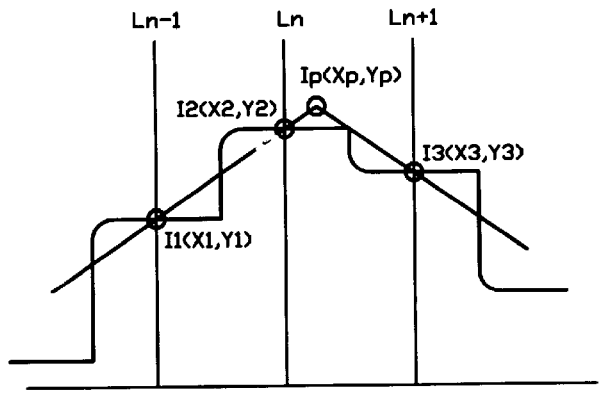
FIG. 5(C) shows the induced signal on a sense line when the center of the coil is not on the sense line.
Figure 5D:
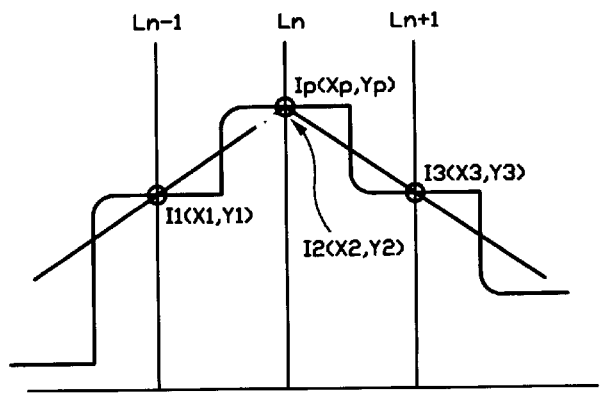
FIG. 5(D) shows the induced signal on a sense line when the center of the coil is exactly on the sense line.
Figure 5E:
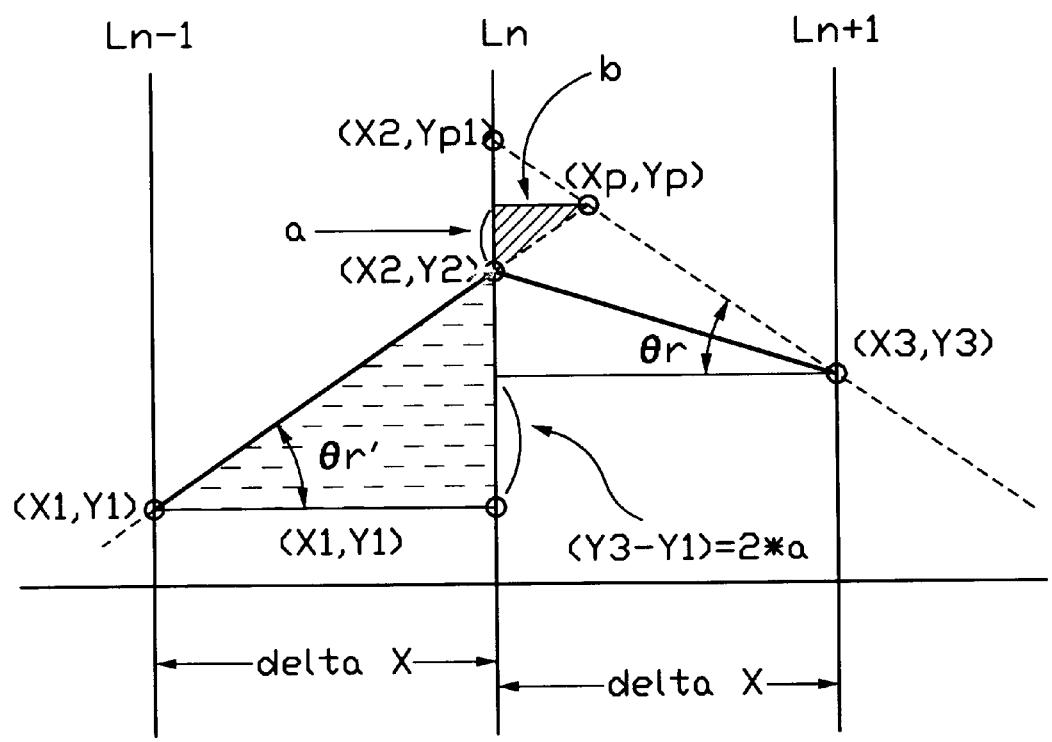
FIG. 5(E) shows the points and the symbols we used in our formulas.

Said approximate parabola curve as shown in FIG. 5(A) is simplified as an two straight lines which is similar to an isosceles triangular as shown in FIG. 5(B). Therefore, the induced signals on a sense lines are shown in FIG. 5(C). Since the slopes of the two straight lines can be determined by only three points, such as the three points I1(X1, Y1), I2(X2, Y2) and I3(X3, Y3) on lines Ln−1, Ln, Ln+1, we do not have to get more than three induced signals. If the pen point IP(XP, YP) is exactly located on line Ln (i.e., the point I2 and IP are overlapped), then the two slopes that formed by three induced signal points are equal, as shown in FIG. 5(D). But if the pen tip is not exactly located on sense line Ln, the two slopes that formed by three induced signal points are not equal, as shown in FIG. 5(C). Refer to FIG. 5(E), since the angles θr and θr' are equal and the two distances "delta X" are equal, therefore, the two triangles enclosed by angles θr and θr' must be equal, thus the following equations can be developed:

$$YP1 = YP2 + (Y3 - Y1)$$

$$YP = (YP1 - YP2) \div 2 + Y2$$

$$a = (Y3 - Y1) \div 2$$

thus the difference of the values Y3 and Y1 is two times of the "line segment a". Further, the right triangle enclosed by "line segment a" and "line segment b" is similar to the right triangle enclosed by the angle θr', wherein the "line segment b"=(XP−X2), thus the follow equation may be developed:

$$(XP - X2)/(\text{delta}X) = ((Y3 - Y1) \div 2)/(Y2 - Y1)$$

if we assume delta X=1, then the XP will be in the range of −0.5~+0.5 and the following equation may be developed:

$$(XP - X2) = (Y3 - Y1)/(2 \times (Y2 - Y1))$$

thus $$XP = X2 + (Y3 - Y1)/(2 \times (Y2 - Y1))$$

wherein, X2 is the know location of any fixed sense line, thus the instrument location XP may be obtained by a very simple calculation, and the expensive high speed microprocessor is unnecessary. Moreover, the current location of the pen tip is simply obtained from only three scanning lines.

Figure 6:
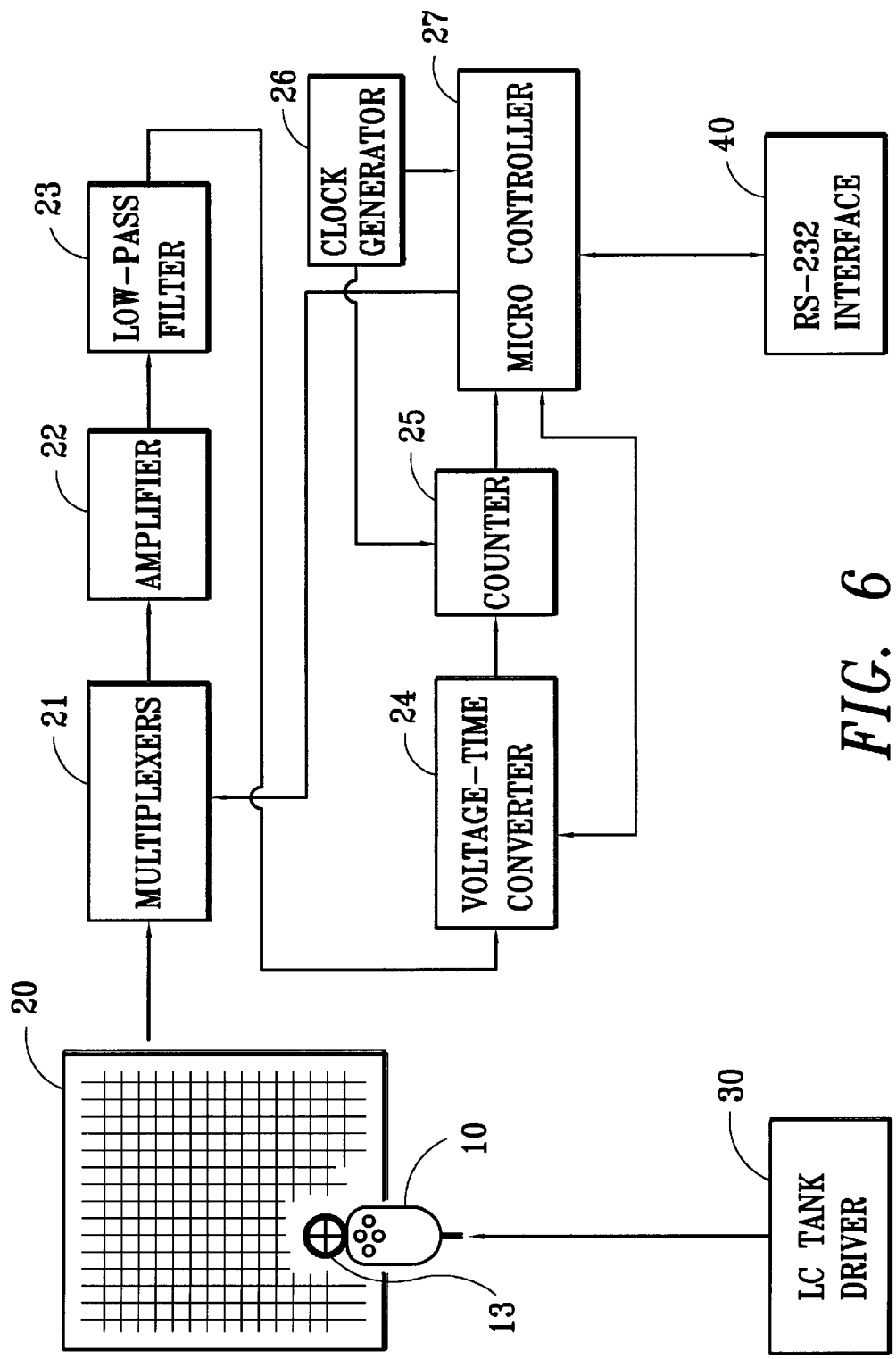
FIG. 6 is the block diagram of the present invention.
Figure 7A:
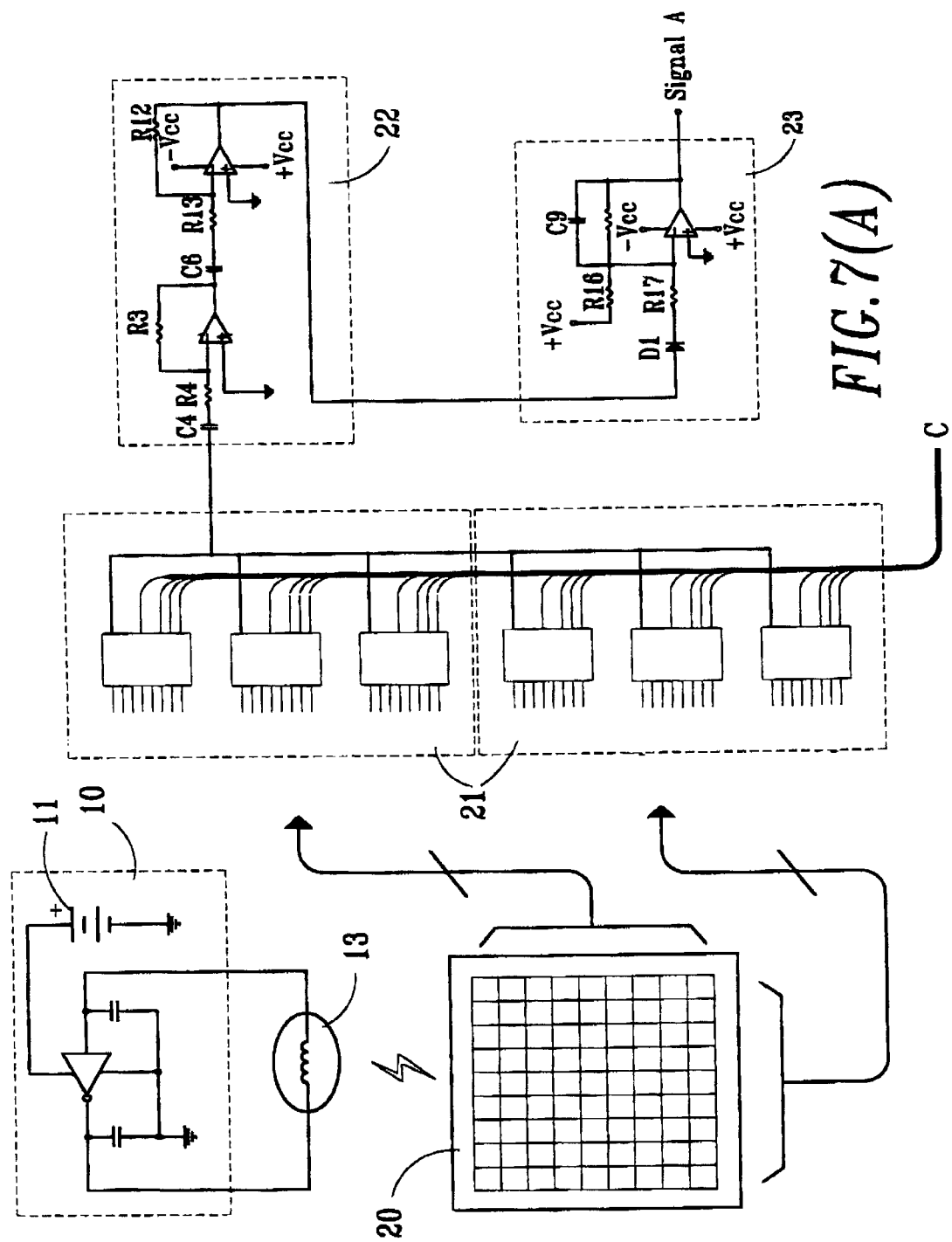
FIGS. 7(A) and 7(B) is the circuit diagram of the present invention.
Figure 7B:
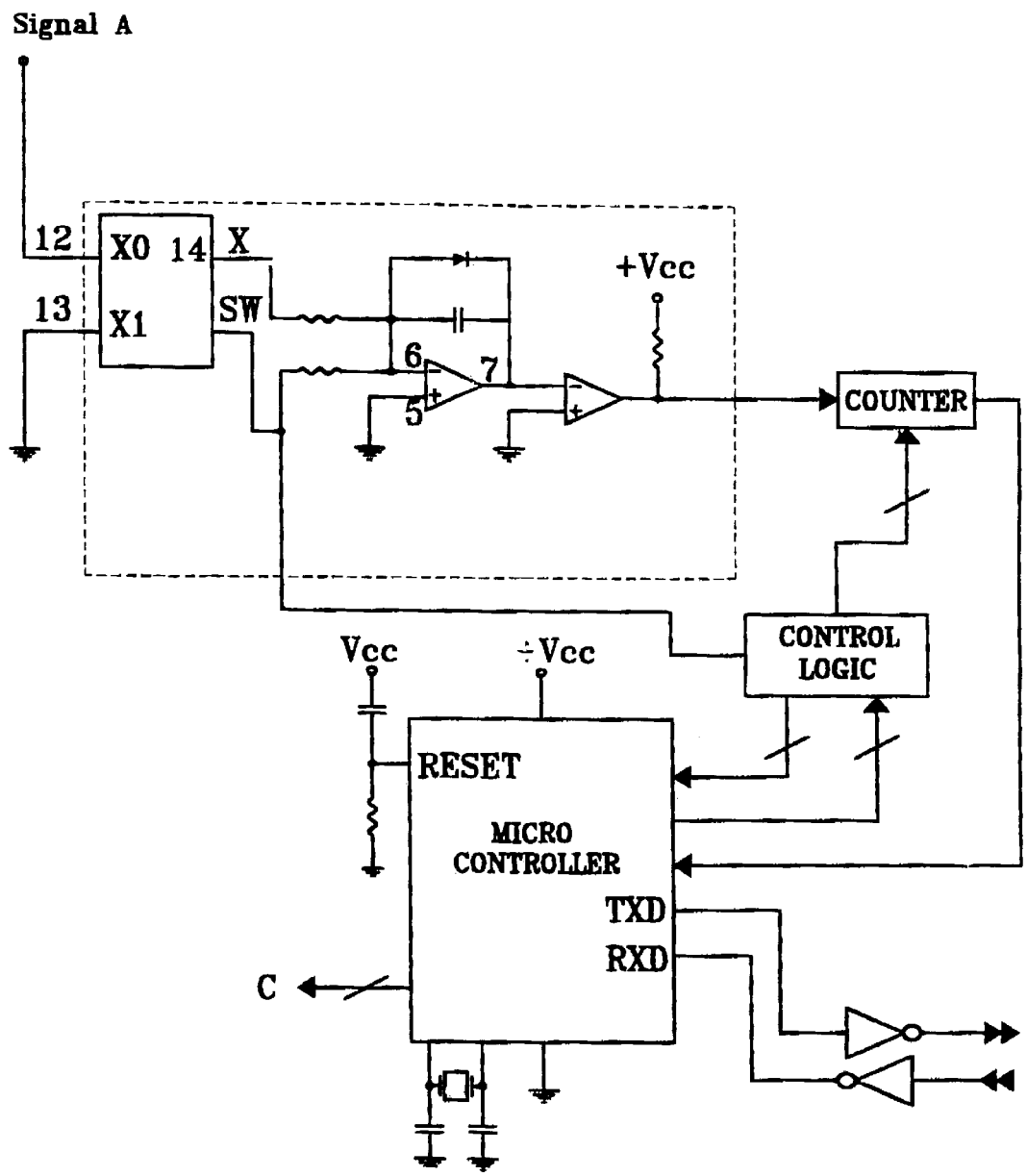

The circuit block diagram of the present invention is shown in FIG. 6, the alternating current signal generated by a coil driver 30 flows through a coil 13 within the pointing pen 10, while the magnetic field generated by the coil 13, an alternating current signal can be induced on the sense line grid 20. A micro-controller 27 is used to control a multiplexer 21 to derive the induced signal of each sense line sequentially, then the signal of each sense line is converted into an DC amplitude signal by a signal amplifier 22 and an amplitude detector (i.e. low pass filter 23), next the signal is further input to a voltage-time converter 24, in which the signals with different amplitudes are converted into pulses with different pulse widths, next, the signal is input into a counter 25 which is counting in a frequency from a clock generator 26, then the result in the counter is input to a microprocessor 27 which is connected to a host computer by a RS-232 interface 40. In the present invention, the voltage—time converter may be replaced by an analog to digital converter to obtain a high speed operation. The circuit diagram of the present invention is shown in FIGS. 7(A) and 7(B), which is a practical implementation of FIG. 6.

Figure 8:
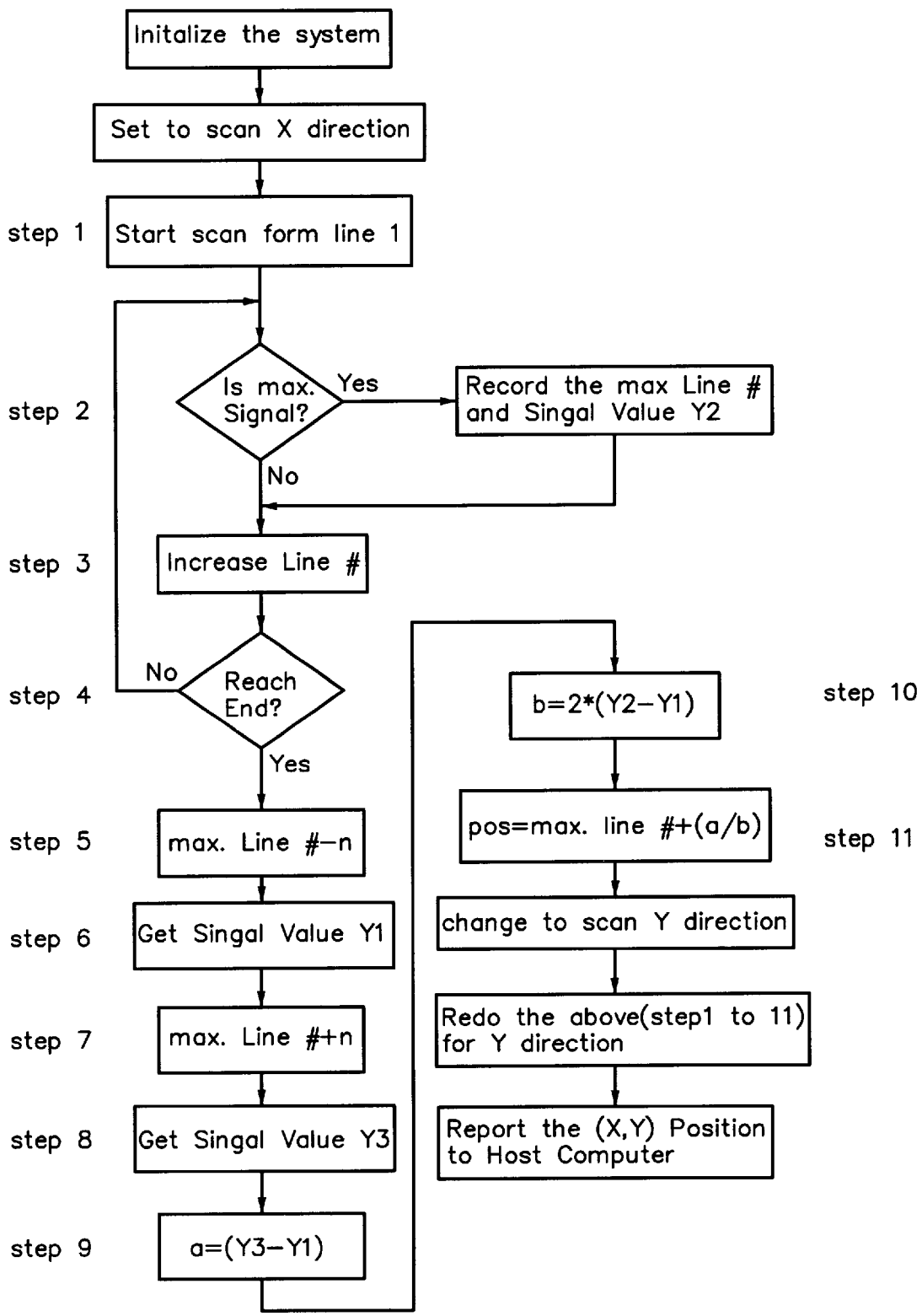
FIG. 8 shows the flow chart diagram of the scanning process in the microcontroller for the present invention.

The flow chart diagram shown in FIG. 8 is the procedures of the scanning operation of the microprocessor in the present invention. At first, the whole working conditions are initially set, for example, the counter and the operating registers are cleared. The next step is to set the scanning to start from X axis, and then set the first conductor as the sense line for receiving the induced signal to get the amplitude of said signal, and then to compare whether the amplitude is larger than all the values we scanned before in X direction. If yes, the location number (Line #) with maximum induced signal and amplitude of the signal are recorded (as Y2). Then the pointer is pointed to the next sense line, and said comparing operation is repeated until the last sense line is scanned. After all the sense lines are scanned, the location number (Line #) with the maximum amplitude is subtracted by N to get the induced signal of the sense line (as Y1) in a fixed distanced. Then the location number (Line #) with the maximum amplitude is added by N according to get the induced signal of another sense line (as Y3) in a fixed distanced on the opposite side. In steps 9 to 11, the signal amplitudes Y1 to Y3 is substituted into said formula, and the obtained POS represents the pen tip location in X direction. In the following steps, set to start the scanning for Y axis, initially the signal of the first scanning inducing line is received and the signal amplitude is read, in which the procedures are the same as the procedures for said X axis, thus a maximum induced signal amplitude and two second induced signal amplitude are derived (another set of Y1 to Y3 for Y axis). Similarly, the values are substituted into said formula, the obtained POS is the pen tip location in Y direction. Next the obtained X and Y locations are reported to the host computer through a transferring interface to a main computer. Then the process is returned to the first step to initially reset the system parameter, then the scanning begins from X axis to restart the scanning operation, thus the process is repeated continuously.

Generally, in practical applications, this technology can, for example, be used to get the pen tip location for controlling the cursor on the screen, etc., such as for picture mapping or making a sketch. However, since the present invention simplifies the induced signal curve as two straight lines, thus the obtained XP may not be the actual location, it can be corrected by a look up table. For example, if the distance between two sense lines is 0.256 inch, and the 0.001 inch accuracy is desired, then it is only needed to build a look up table with 256 terms, every time the length of line segment b (=XP−X2) is obtained, we can use the length of b as the index to get the adjustment value. And the adjustment value is employed to correct the XP value, therefore, the most precise XP value may be obtained in a simple way and the efficiency will not be reduced, while the cost is not increased.

When noise is generated during the process of the signals amplifying, filtering, etc., the DC voltage of the amplitude is drifted, the location of peak value will not be changed. Because the two slope lines formed by three induced signal can maintain the same slope rate. So the peak amplitude still can be obtained in the same sense line. Moreover, the phase detecting is not needed, only the amplitude of the signal is needed for the calculation.

However, in the present invention we can ignore the frequency and phase of the signals emitted by said coil. Therefore, an oscillating circuit is used in a instrument (for example, a stylus pen), the emitting frequency can be changed if needed. For example, we may arrange some switches on the instrument, and the on/off state of said switches will change the oscillating frequency. Furthermore, we can use a counting unit in the tablet to count the frequency of the induced signal on the sense line. With the count value we can recognize the state of the switches on the instrument.

While the present invention has been described in connection with what is considered the most practical and preferred embodiment, it is understood that this invention is not limited to the disclosed embodiments but is intended to cover various arrangements included within the spirit and scope of the broadest interpretation so as to encompass all such modifications and equivalent arrangements.

What is claimed is:

1. An apparatus for producing a digital number representing a location of an instrument with respect to a plurality of spaced conductors, said apparatus determining the location solely by scanning induced signal amplitudes, comprising:
   an instrument that includes a signal emitting means for inducing an alternating current signal in a set of spaced parallel conductors
   means for selectively sampling said induced alternating current signal;
   a signal processing unit including:
      I. means for producing digitized numbers representing amplitudes of said induced alternating current signal on said conductor;
      II. scanning means for finding the following three digitized numbers:
         (i) a maximum digitized number representing the maximum amplitude of said induced alternating current signal, said conductor having the maximum amplitude induced thereon being referred to as a peak value conductor,
         (ii) a first digitized number representing the amplitude of a signal induced on a conductor which is a fixed distance from the peak value conductor, and
         (iii) a second digitized number representing the amplitude of a signal induced on a conductor which is also said fixed distance from said peak value conductor; and
      III. means for calculating a coarse location of said signal emitting means relative to a signal conductor having a known location along an axis, said coarse location calculating means calculating said coarse location as a function solely of said maximum, first, and second digitized numbers.

2. Apparatus as claimed in claim 1, wherein said axis is an X-axis and said function solely of said maximum, first, and second digitized numbers is as follows:

$$XP-X=\tfrac{1}{2}(Y3-Y1)/(Y2-Y1),$$

where XP is the location of said signal emitting means, X2 is a known location of any signal line, Y2 is the amplitude of the peak value conductor, Y1 is the amplitude of the conductor which is on a first side of the peak value conductor, and Y3 is the amplitude of the conductor which is on the second side of the peak value conductor.

3. The apparatus of claim 2, further comprising a look up table arranged to determine a fine position of the signal emitting device following said determination of said coarse location.

4. The apparatus of claim 3, further comprising a means for comparing said function with a set of predetermined ratios in said look up table to determine an accurate location of said instrument relative to said plurality of conductors.

5. Apparatus as claimed in claim 1, wherein said axis is an X-axis, and further comprising means for calculating a coarse position of the signal emitting means along a Y-axis based on three digitized numbers representative of a maximum amplitude signal induced on a peak value conductor, and amplitudes of signals on conductors situated a fixed distance from the peak value conductor along said Y-axis.

* * * * *